United States Patent
Torres

(10) Patent No.: US 12,472,498 B2
(45) Date of Patent: Nov. 18, 2025

(54) MICROFLUIDIC DEVICE AND METHOD OF MANUFACTURE THEREOF

(71) Applicant: Honeywell Federal Manufacturing & Technologies, LLC, Kansas City, MO (US)

(72) Inventor: Sabrina Marie Wells Torres, Lee's Summit, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 1022 days.

(21) Appl. No.: 17/539,746

(22) Filed: Dec. 1, 2021

(65) Prior Publication Data

US 2023/0166253 A1 Jun. 1, 2023

(51) Int. Cl.
*B01L 3/00* (2006.01)
*B01D 17/04* (2006.01)
*B01F 33/30* (2022.01)

(52) U.S. Cl.
CPC ...... *B01L 3/502746* (2013.01); *B01D 17/045* (2013.01); *B01F 33/30* (2022.01); *B01L 3/502707* (2013.01); *B01L 2200/12* (2013.01); *B01L 2300/12* (2013.01); *B01L 2300/161* (2013.01); *B01L 2400/088* (2013.01)

(58) Field of Classification Search
CPC ............ B01L 2200/12; B01L 2300/12; B01L 2300/161; B01L 2300/0816; B01L 2300/165; B01L 2400/088; B01L 2400/086; B01F 33/30; B01F 33/30351; B01D 17/045

See application file for complete search history.

(56) References Cited

U.S. PATENT DOCUMENTS

| | | | |
|---|---|---|---|
| 11,000,975 B2 | 5/2021 | Shin et al. | |
| 2002/0150683 A1* | 10/2002 | Troian | B01F 33/3021 137/828 |
| 2006/0096923 A1* | 5/2006 | Wagler | B01J 19/0093 210/101 |
| 2019/0329251 A1 | 10/2019 | Ortner et al. | |

FOREIGN PATENT DOCUMENTS

KR 2020139332 A * 12/2020

OTHER PUBLICATIONS

Espacenet English Translation of KR20200139332A. (Year: 2020).*
Sugioka, Koji et al., "Femtosecond laser 3D micromachining: a powerful tool for the fabrication of microfluidics, optofluidics, and electrofluidics based on glass", Lab on a Chip, Jun. 10, 2014, pp. 1-36, LC-CRV-05-2014-000548.R1.

(Continued)

Primary Examiner — Kathryn Elizabeth Limbaugh
(74) Attorney, Agent, or Firm — Erise IP, P.A.

(57) ABSTRACT

A microfluidic device having hydrophobic and hydrophilic regions and a method of manufacture thereof are provided. The microfluidic device may include one or more channels formed using a short-pulse laser that are configured for separation or mixing of fluids. The microfluidic device may further include hydrophilic or hydrophobic surfaces configured to aid in the separation or mixture of fluids. The short-pulse laser may be a femtosecond laser.

20 Claims, 11 Drawing Sheets

(56) References Cited

OTHER PUBLICATIONS

Choi, Jiyeon et al., "Advances in femtosecond laser processing of optical material for device applications", International Journal of Applied Glass Science, Dec. 22, 2019, pp. 480-490.
Okamoto, Yasuhiro et al., "Effect of numerical aperture on molten area characteristics in micro-joining of glass by bicosecond pulsed laser", International Institute of Welding, Mar. 13, 2020, pp. 937-947.

* cited by examiner

MICROFLUIDIC DEVICE AND METHOD OF MANUFACTURE THEREOF

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate generally to microfluidic devices. More specifically, embodiments of the present invention are directed to microfluidic devices comprising hydrophilic and hydrophobic surfaces.

2. Related Art

The wettability of solid surfaces has been a subject of interest for many years due to the wide-ranging applications involving such interactions. Surface wettability is commonly measured in terms of contact angle. Surfaces exhibiting a water contact angle below 90° are generally termed hydrophilic surfaces while those with a water contact angle greater than 90° are generally termed hydrophobic surfaces. Superhydrophobic surfaces have contact angles with water that are above 150°. Surface energy and roughness are the major contributing factors that determine whether a surface is wetting or non-wetting. An important parameter used to characterize the wetting nature of surfaces is the contact angle hysteresis. This can be measured as the difference between the advancing and receding contact angles at the instant before a droplet rolls off the surface as it is tilted. This is often used to characterize whether the surface is sticky or slippery. A small contact angle hysteresis is desirable when slippery surfaces with low roll off angles are required.

The surface roughness or structure is an important factor in determining the wettability of a surface. Many studies to understand the effects of surface structure on the wettability of materials reported the structural requirements such as aspect ratio and spacing between features to achieve the hydrophobicity or hydrophilicity. For instance, the Cassie-Baxter state promotes non-wetting by reducing the surface area of a material in contact with the liquid. The Cassie-Baxter state also helps achieve lower contact angle hysteresis making the roll off angle smaller. Convex structures with rounded tops promote the Cassie-Baxter state and help achieve hydrophobicity. Materials that are inherently hydrophilic require a chemical coating or treatment to make them hydrophobic. Alternatively, materials that are inherently hydrophobic require a chemical coating or treatment to make them hydrophilic. These and other considerations must be used when altering surface structure.

There are several applications of hydrophobic, superhydrophobic, hydrophilic, and superhydrophilic surfaces in fields such as biological cell research, opto-fluidics, fuel cell research, drag reduction, printing, liquid mixture, liquid separation, etc. The choice of materials, fabrication technique, and degree of hydrophobicity or hydrophilicity required depends on the specific application. Microfluidics is one such a field where surface wettability plays an important role. The contact angle and roll off angle of a liquid flowing through a micro channel influence the flow characteristics. Microfluidics are used in many applications such as DNA analysis, enzymatic analysis, and clinical pathology, among others; some of which require the flow rate in micro channels to be controllable. External flow control devices such as press generators and pumps are often used to control the flow rate through these devices. However, in cases where individual channels in a device are to be controlled, internal flow controls are required. This is often achieved by varying the channel cross section or by using flow control valves. A more space efficient alternative to this is to alter the wettability of channel walls so as to vary the flow rate through the channel.

Another area in which microfluidic devices are employed is flow chemistry. In this case, chemicals are either mixed or separated. This can be performed either at the benchtop level with microfluidic devices or scaled up to large batch processing having similar concepts and mechanisms to the smaller scale flow chemistry techniques. Current methods of mixing employ either passive or active means of mixing. In passive mixing, no external sources are used. Thus, mixing typically relies on the microfluidic chip geometry and on fluid properties. Under laminar flow, which is the typical fluid regime in microfluidics, mixing mostly happens though diffusion. This property allows one to perform mixing using lamination: two or more liquids are flowing in parallel, allowing for diffusion to happen. These reactions often take place in chemically resistant plastic materials, like ethylene tetrafluoroethylene (ETFE), where microstructure and chemistry of flow paths is easily controlled. However, there is a need for transparent, non-opaque microfluidic devices to allow visual inspection of proper mixing of materials in the reaction. Furthermore, certain plastics may decompose, swell, or break down, following exposure to harsh chemicals, thereby limiting the life of the microfluidic device as well as compromising the reaction. Therefore, there is a need for more durable non-reactive materials in microfluidic devices.

As mentioned above, microfluidic devices may also be employed for separation of materials. These methods typically utilize membrane filtration techniques to separate a homogenous mixture. Problems with these devices arise once the membrane becomes overwhelmed with large molecules, such as lipid-based structures. This requires regular maintenance of the device and loss of separated product due to blockage and time lost.

Thus, there exists an unmet need for a reliable microfluidic device that causes the effective and passive mixture or separation of materials in flow chemistry.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a microfluidic device including: a substrate including an upper surface; one or more inflow channels laser-engraved into the upper surface; one or more outflow channels laser-engraved into the upper surface, the one or more outflow channels fluidly connected to the one or more inflow channels; a first portion of the upper surface configured to be hydrophilic; and a second portion of the upper surface configured to be hydrophobic. In some aspects, a first portion may be hydrophilic and a second portion may be hydrophobic.

In some aspects, the techniques described herein relate to a microfluidic device, wherein one or more inflow channels include the first portion.

In some aspects, the techniques described herein relate to a microfluidic device, wherein one or more outflow channels include the first portion.

In some aspects, the techniques described herein relate to a microfluidic device, further including a pooling area disposed between the one or more inflow channels and the one or more outflow channels.

In some aspects, the techniques described herein relate to a microfluidic device, wherein one or more outflow channels include the second portion.

In some aspects, the techniques described herein relate to a microfluidic device, wherein the substrate includes glass, quartz, or a metallic alloy.

In some aspects, the techniques described herein relate to a microfluidic device, wherein the first portion includes microstructures configured to be hydrophilic formed via a femtosecond laser.

In some aspects, the techniques described herein relate to a microfluidic device, wherein the second portion includes a hydrophobic compound coated thereon.

In some aspects, the techniques described herein relate to a system for mixing or separating liquids, the system including: a microfluidic device including a substrate having an upper surface; at least one input path and at least one output path on the upper surface; a first portion of the upper surface including a microstructure pattern configured to make the first portion hydrophilic; and a second portion of the upper surface including a hydrophobic compound disposed thereon, wherein the second portion is configured to be hydrophobic.

In some aspects, the techniques described herein relate to a system, wherein the microstructure pattern includes a plurality of pyramidal protrusions engraved via a femtosecond laser.

In some aspects, the techniques described herein relate to a system, wherein the at least one input path and the at least one output path include openings configured to be fluidly coupled to external components of a flow chemistry process.

In some aspects, the techniques described herein relate to a system, wherein the at least one input path and the at least one output path include one or more paths laser-engraved into the upper surface of the substrate.

In some aspects, the techniques described herein relate to a system, further including a mixing pool fluidly coupled to the at least one input path and the at least one output path and disposed therebetween.

In some aspects, the techniques described herein relate to a system, wherein the at least one input path comprises at least two input paths comprising the first portion, thereby configured to mix hydrophilic compositions.

In some aspects, the techniques described herein relate to a system, wherein the at least one output path comprises a first output path and a second output path, wherein the first output path comprises the first portion and the second output path comprises the second portion, thereby configured to separate hydrophilic compositions along the first output path and hydrophobic compositions along the second output path.

In some aspects, the techniques described herein relate to a system, wherein the substrate includes glass, quartz, or a nickel-chromium-iron-molybdenum alloy.

In some aspects, the techniques described herein relate to a method of manufacturing a microfluidic device having a hydrophilic region and a hydrophobic region, the method including the steps of: engraving a first portion of a substrate via laser pulses using a femtosecond laser to create a hydrophilic region; and coating a hydrophobic compound on a second portion of the substrate, to create a hydrophobic region.

In some aspects, the techniques described herein relate to a method, further including the step: securing a cover onto the substrate.

In some aspects, the techniques described herein relate to a method, wherein the femtosecond laser includes a single-pulse femtosecond laser or a dual-pulse femtosecond laser.

In some aspects, the techniques described herein relate to a method, further including: removing a section of the hydrophobic compound from the substrate via the femtosecond laser.

BRIEF DESCRIPTION OF THE DRAWING FIGURES

Embodiments of the invention are described in detail below with reference to the attached drawing figures, wherein.

Figure 4A:
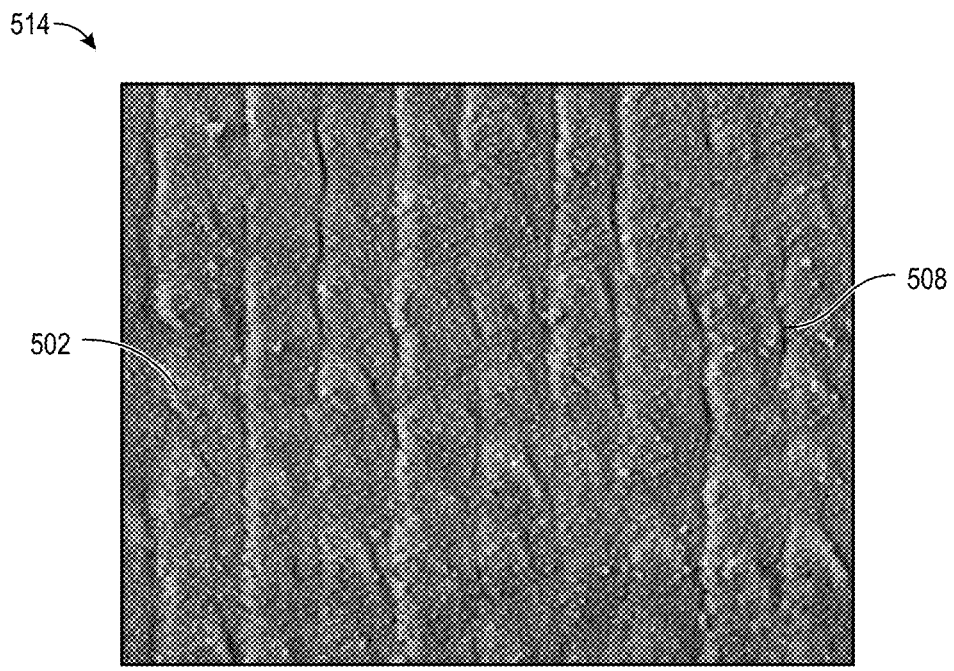
Figure 4B:
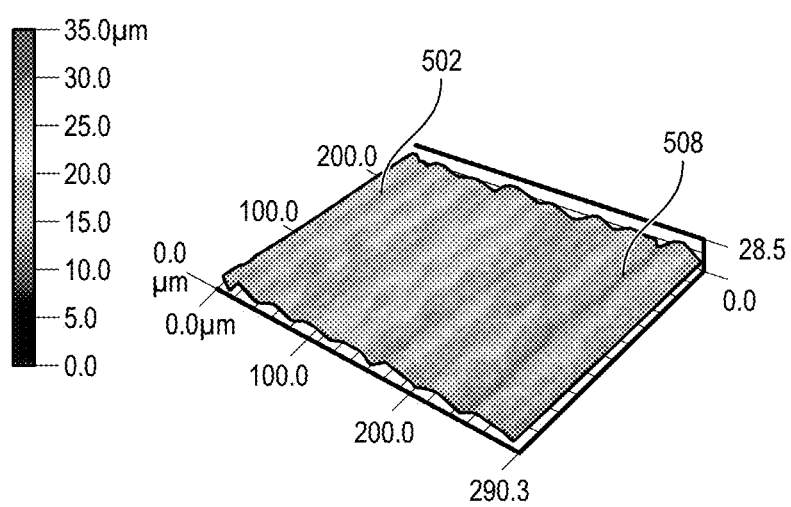
Figure 4C:
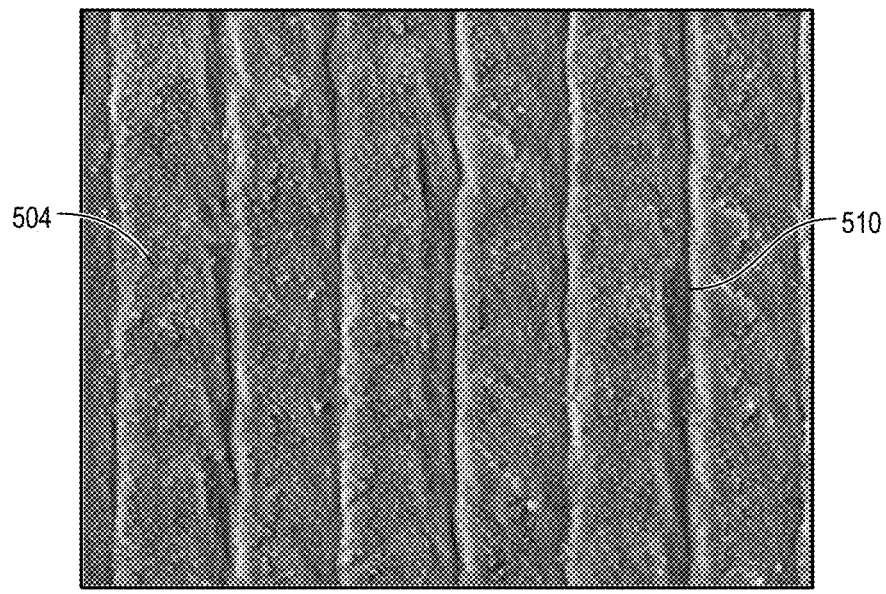
Figure 4D:
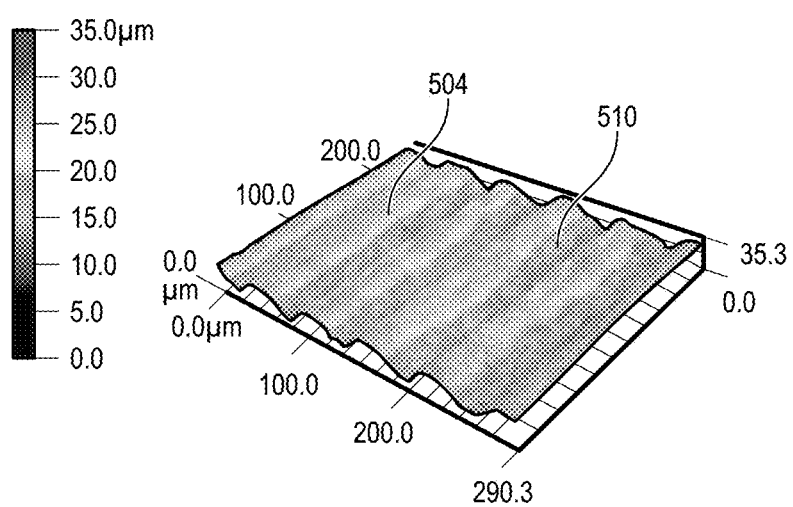
Figure 4E:
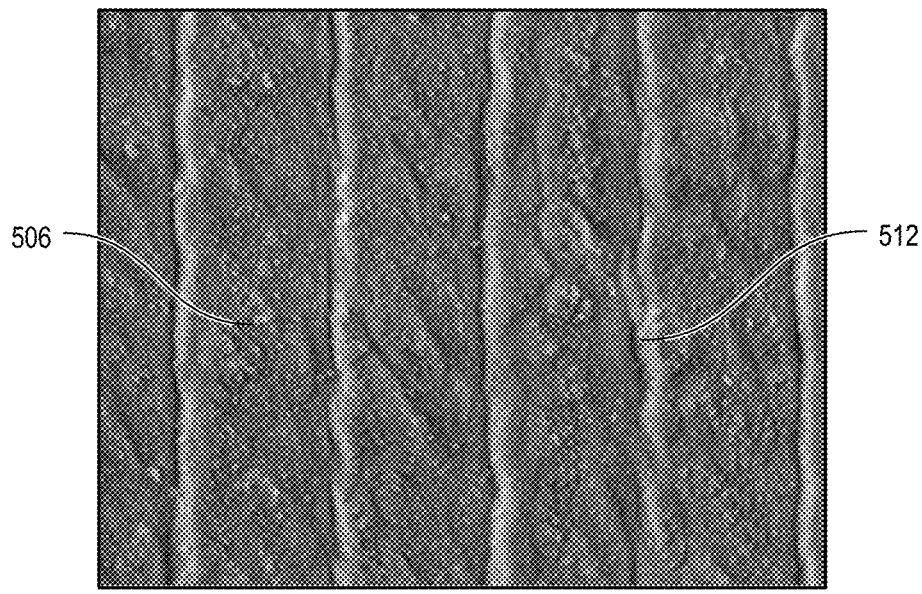
Figure 4F:
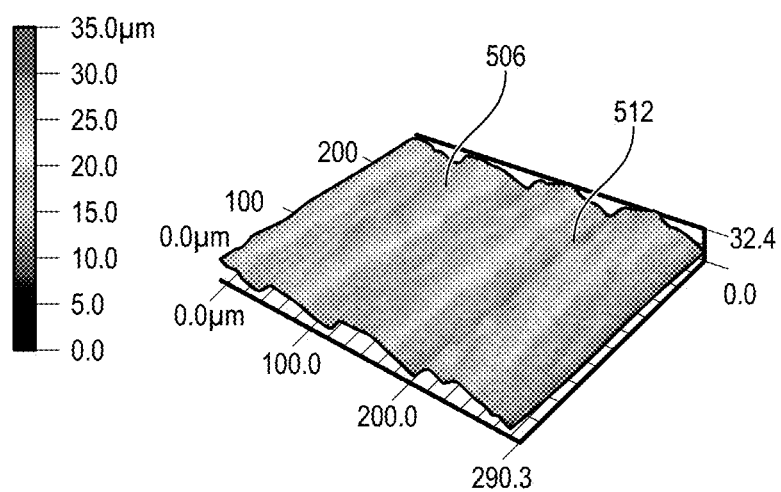
Figure 4G:
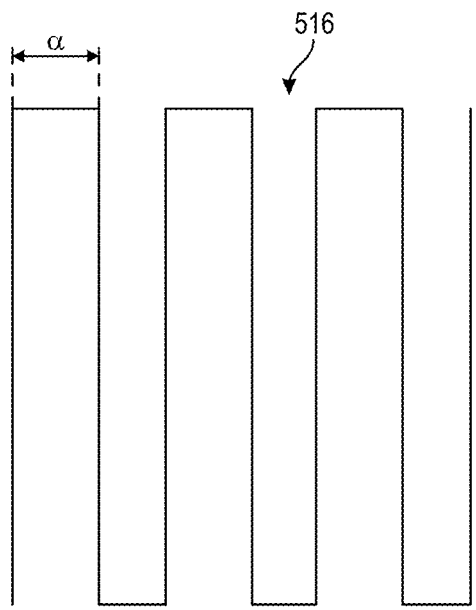
Figure 5A:
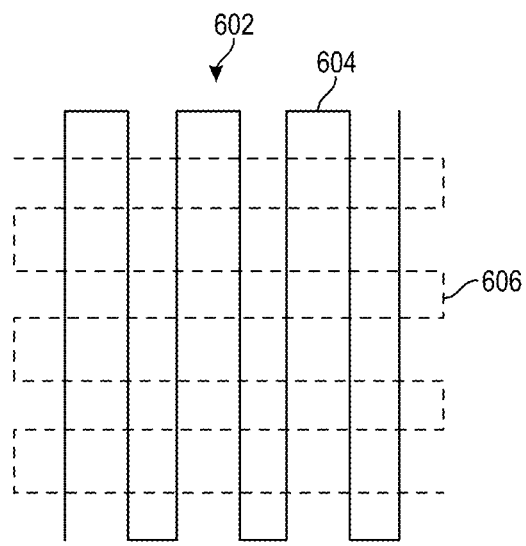
Figure 6:
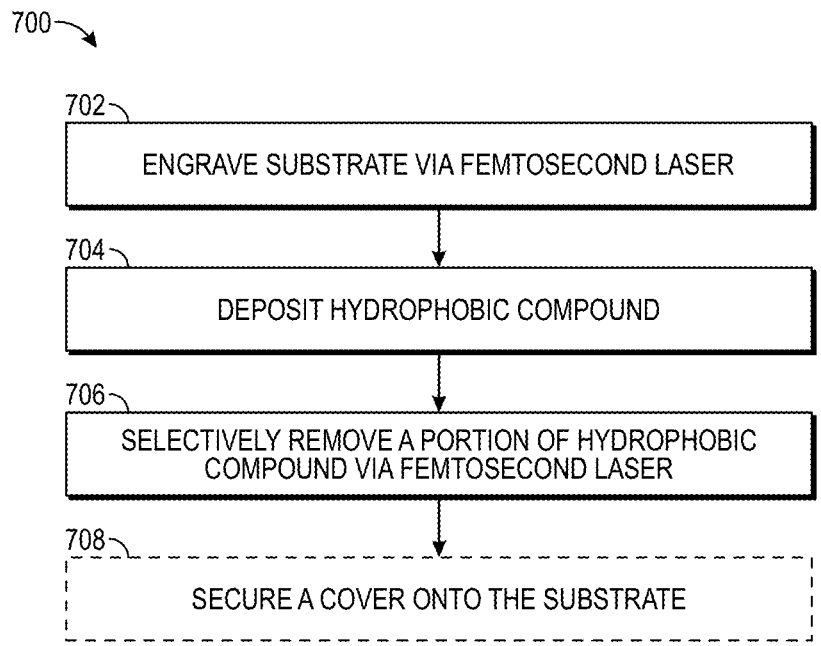
Figure 7:
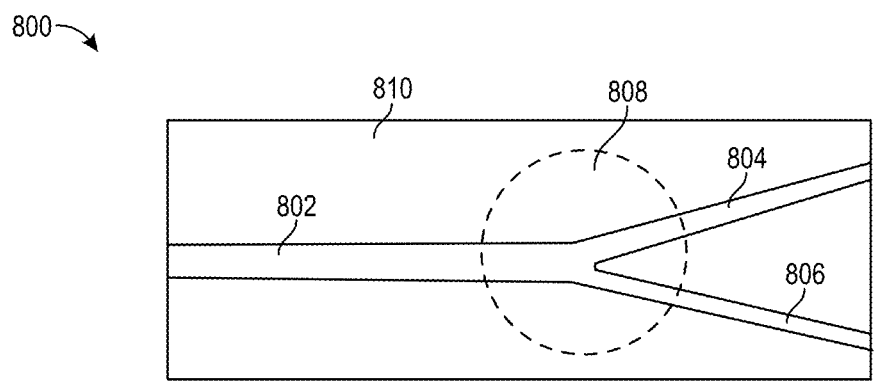
Figure 8A:
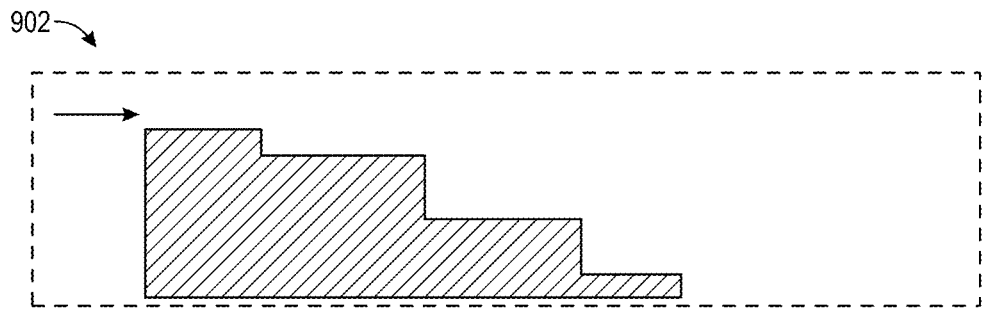
Figure 8B:
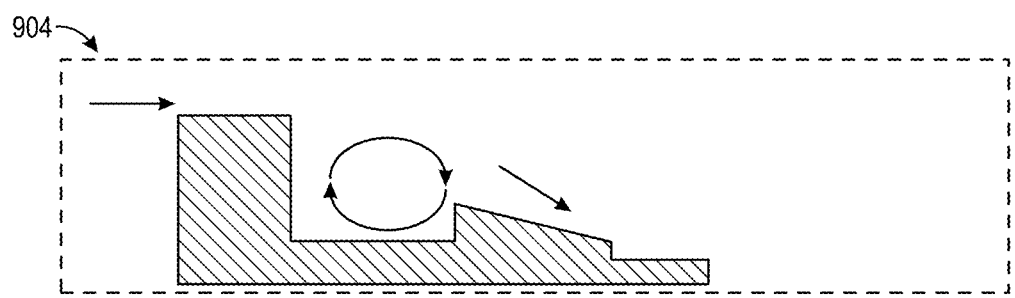

FIGS. 4A, 4B, 4C, 4D, 4E, and 4F depict parallel channels formed on a substrate using a femtosecond laser system, in some embodiments;

FIG. 4G is a depiction of a line scan used to form parallel channels, in some embodiments;

FIG. 5A is a depiction of a line scan used to form pyramidal protrusions, in some embodiments;

FIGS. 5B, 5C, 5D, and 5E depict pyramidal protrusions formed on a substrate using a femtosecond laser system, in some embodiments;

FIG. 6 is a flow-chart illustrating a method of producing a microfluidic device, in some embodiments;

FIG. 7 is a top view of an exemplary microfluidic device, in some embodiments; and FIGS. 8A and 8B are side views of a path within a microfluidic device, in some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the invention are directed to a microfluidic device and a method of producing the microfluidic device, wherein the microfluidic device comprises one or both of a hydrophilic surface and a hydrophobic surface. The microfluidic device may be produced via laser engraving on a substrate using a femtosecond laser. In some embodiments, the structure formed by the engraving process provides one or both of hydrophilic and/or hydrophobic surfaces.

Figure 1:
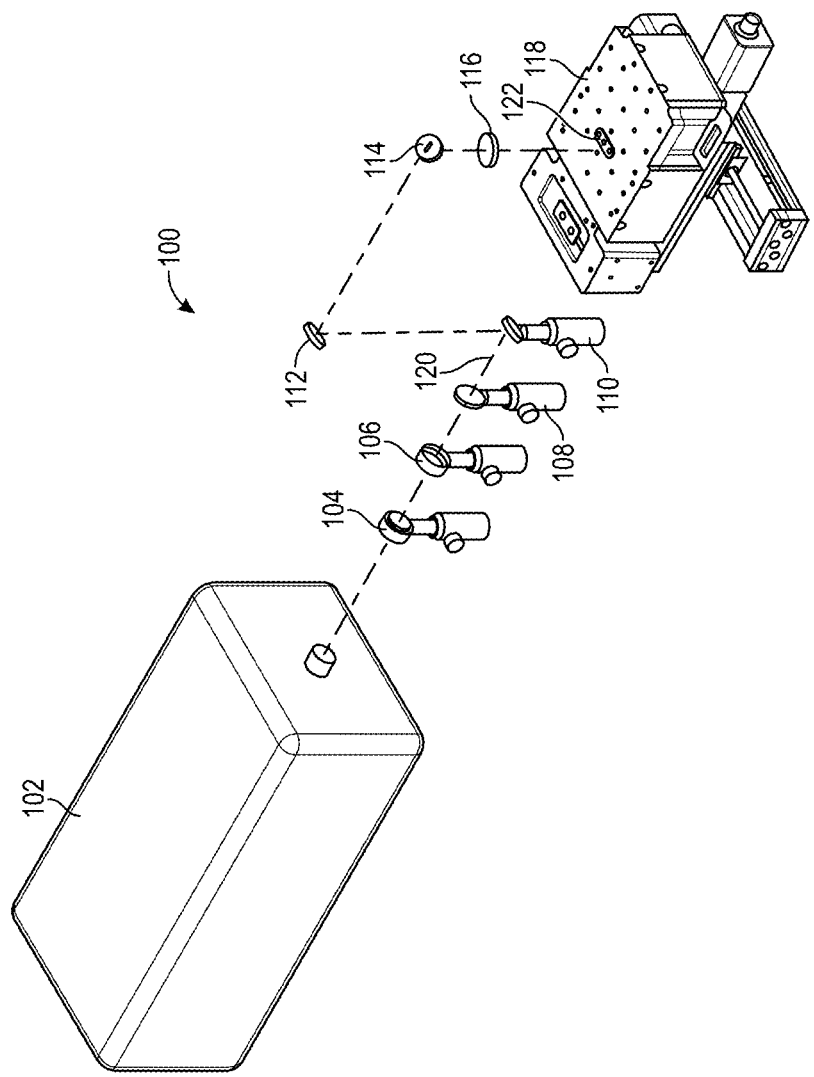
FIG. 1 is a schematic view of various hardware components of a single-pulse laser, used to perform various aspects of some embodiments.

FIG. 1 illustrates a laser system, for example an ultra-short pulse, single-pulse laser system 100, configured to perform laser engraving on a substrate. Features and structures illustrated include a light source 102, shutter 104, half-wave plate 106, polarizer 108, first mirror 110, second mirror 112, third mirror 114, lens 116, and translation stage 118. Embodiments of the invention may incorporate any or all of the features and structures illustrated, and may include additional features or structures not illustrated in FIG. 1. In some embodiments, single pulse laser system 100 comprises a femtosecond laser. Use of a femtosecond pulse laser reduces microcracks and crystalline changes and works with thin films. A femtosecond ($10^{-15}$) pulse is over before energy is transferred to ions.

In FIG. 1, a beam of light is generated at light source 102 using an emitter, such as an ultrashort, femtosecond pulsed laser emitter. Light source 102 may be coupled to computer 302 (shown in FIG. 3) and/or a power source, such as a battery or wall outlet. In some embodiments, shutter 104 may fluctuate the timing of light pulses from light source 102. For example, shutter 104 may be configured to open and close within the femtosecond range. The light source is incident into a single mode fiber using half-wave plate 106 and polarizer 108. The generated beam from the single mode fiber constitutes a source beam 120. The source beam 120, in some embodiments, may be reflected using one or more of first mirror 110, second mirror 112, or third mirror 114. The one or more mirrors may be used to redirect the source beam 120, such that source beam 120 directly or incidentally lands on translation stage 118. Following redirection by the one or more mirrors, source beam 120 is focused using lens 116, such that the convergence of source beam 120 is near a sample 122 on translation stage 118. Translation stage 118 allows for movement of sample 122 along the x-axis, y-axis, and z-axis. In some embodiments, translation stage 118 may be connected to and controlled by computer 302.

As will be discussed below, movement of sample 122 may allow laser system 100 to engrave specific patterns onto sample 122. In some embodiments, sample 122 may comprise any material suitable for microfluidic devices. In some embodiments, sample 122 comprises a glass material, such as borosilicate glass. In some embodiments, sample 122 comprises a quartz material. In some embodiments, sample 122 comprises a nickel-chromium-iron-molybdenum alloy material, such as Hastelloy® X. It is further contemplated that sample 122 may comprise one or more of a metal, a plastic, a metal alloy, a ceramic, or any other material known to a person skilled in the art to function as a microfluidic device.

In some embodiments, light source 102 is a femtosecond laser producing 35 fs pulses, with a central wavelength of 800 nm and a repetition rate of 1 kHz. The laser beam 120 may be focused to a spot diameter of approximately 250 µm and raster scanned across the surface of a substrate. In some embodiments, the total power of the light source 102 is about 750 mW to about 900 mW.

Figure 2A:
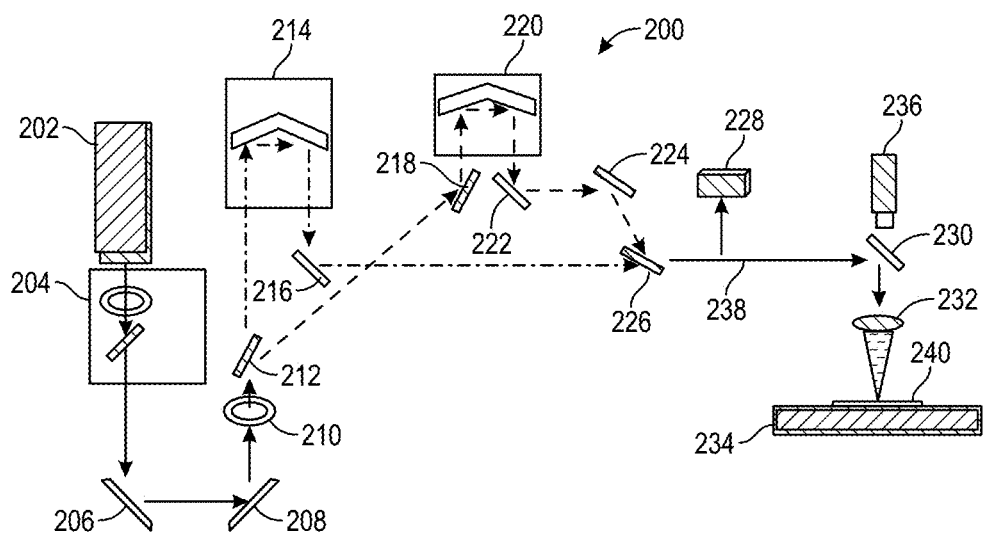
FIG. 2A is a schematic view of various hardware components of a dual-pulse laser, used to perform various aspects of some embodiments.

Another example system, for example an ultra-short pulse dual-pulse laser system 200, configured to perform laser engraving on a microfluidic device is illustrated in FIG. 2A. Features and structures illustrated include a light source 202, power attenuator 204, first mirror 206, second mirror 208, half-wave plate 210, first polarizer 212, trailing pulse stage 214, third mirror 216, second polarizer 218, leading pulse stage 220, fourth mirror 222, third polarizer 224, fourth polarizer 226, autocorrelator 228, fifth mirror 230, lens 232, translation stage 234, and camera 236. Embodiments of the invention may incorporate any or all of the features and structures illustrated, and may include additional features or structures not illustrated in FIG. 2A. Although five mirrors are illustrated, any number of mirrors may be used in the system depending on the desired configuration. Although four polarizers are illustrated, any number of polarizers may be used in the system depending on the desired configuration. In some embodiments, dual pulse laser system 200 comprises a femtosecond laser. In some embodiments, the pulse pair delay is about 100 ps to about 300 ps. In some embodiments, a laser fluence of about 0.8 J/cm$^2$ to about 19 J/cm$^2$ is used to produce a uniform structuring on the surface of the substrate.

In FIG. 2A, a beam of light is generated at light source 202 using an emitter, such as an ultrashort, femtosecond pulsed laser emitter. Light source 202 may be coupled to computer 302 and/or a power source, such as a battery or wall outlet. In some embodiments, the power of the light emitted from light source 202 may be attenuated using power attenuator 204. Light may then be redirected by first mirror 206 and second mirror 208 towards half-wave plate 210. In some embodiments, one or more of the power attenuator 204 or the half-wave plate 210 may be configured to control the power, or fluence, of source beam 238. Following this, light may interact with the first polarizer 212, which, in some embodiments, may generate a horizontally-polarized light and a vertically-polarized light. These separately polarized light beams may be split, wherein one is directed towards the trailing pulse stage 214 and the other directed towards the leading pulse stage 220. In some embodiments, the horizontally-polarized light may be directed to the trailing pulse stage 214 and the vertically-polarized light may be directed to the leading pulse stage 220. In some embodiments, the vertically-polarized light may be directed to the trailing pulse stage 214 and the horizontally-polarized light may be directed to the leading pulse stage 220.

Polarized light exiting the trailing pulse stage 214 is redirected by third mirror 216 towards fourth polarizer 226. Polarized light exiting the leading pulse stage 220 is redirected by fourth mirror 222 and third polarizer 224 towards fourth polarizer 226. These separately polarized lights are combined at the fourth polarizer 226 to generate source beam 238. Source beam 238 is directed to autocorrelator 228 and fifth mirror 230. Autocorrelator 228 may measure the pulse duration of laser system 200, which may be determined from the measurement of the time delay and the intensity of source beam 238. In some embodiments, autocorrelator 228 may measure the pulse count, which is a function of the pulse delay and scan velocity. In some embodiments, autocorrelator 228 may be connected to computer 302 to relay information regarding pulse delay and/or pulse count of source beam 238.

Source beam 238 is redirected by the fifth mirror 230 towards lens 232. Lens 232 may be configured to cause convergence of source beam 238 on or near translation stage 234. In some embodiments, lens 232 may regulate the diameter of source beam 238 (i.e., beam diameter) when source beam 238 interacts with sample 240. In some embodiments, location of translation stage 234 in the z-axis may regulate the diameter of source beam 238 (i.e., beam diameter) when source beam 238 interacts with sample 240. Translation stage 234 allows for movement of sample 240 along the x-axis, y-axis, and z-axis. In some embodiments, translation stage 234 may be connected to and controlled by computer 302. In some embodiments, computer 302 may control the scan velocity of translation stage 234. This, in turn, may control the pulse count as mentioned above. In some embodiments, movement of translation stage 234 will control the distance between scans (i.e., pitch) of sample 240 with source beam 238. As will be discussed below, movement of sample 240 may allow for specific patterns of engraving from the laser system 200 onto sample 240.

In embodiments, sample 240 may comprise any material suitable for microfluidic devices. In some embodiments, sample 240 comprises a glass material, such as borosilicate glass. In some embodiments, sample 240 comprises a quartz material. In some embodiments, sample 240 comprises a nickel-chromium-iron-molybdenum alloy, such as Hastelloy® X. It is contemplated that sample 240 may comprise one or more of a metal, a plastic, a metal alloy, a ceramic, or any other material known to a person skilled in the art to function as a microfluidic device.

In some embodiments, a borosilicate sample 240 is originally superhydrophilic when uncoated and untreated. Treating the borosilicate sample 240 with a coating of fluorinated silane modifies the surface to be less hydrophilic. However, when sample 240 is modified by the surface laser engraving as disclosed herein and also comprises a subsequent fluorinated silane coating thereon, the surface becomes superhydrophobic.

Figure 2B:
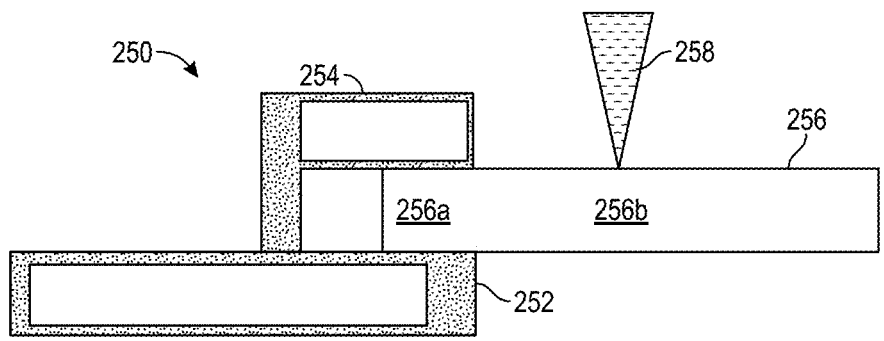
FIG. 2B is a schematic view of a translation stage, used to perform various aspects of some embodiments.

FIG. 2B illustrates a translation stage 250 suitable for holding and engraving a substrate with laser system 100/200, in some embodiments. Translation stage 250 may include a lower clamp 252 and an upper clamp 254. In some embodiments, upper clamp 254 biases a first portion 256a of a sample 256 towards lower clamp 252, therein maintaining sample 256 stable on translation stage 250. Translation stage 250 leaves a second portion 256b of sample 256 protruding outwardly from lower clamp 252 and upper clamp 254, wherein second portion 256b may be engraved by laser beam 258. In some embodiments, translation stage 250 provides an empty space above and below sample 256. In typical stages, lower clamp 252 is fully covered by sample 256, providing a flat surface completely in contact with the lower surface of sample 256. For purposes of engraving sample 256 with laser beam 258, this may affect the composition and sturdiness of lower clamp 252. This may be especially important when sample 256 is partially or predominantly transparent, as in some embodiments of the present invention. For example, in some embodiments sample 256 may comprise a glass material which is substantially transparent. In some embodiments, sample 256 may comprise a quartz material which is substantially transparent. In these embodiments, translation stage 250 may be used to prevent laser beam 258 from interacting with and damaging lower clamp 252.

Figure 3:
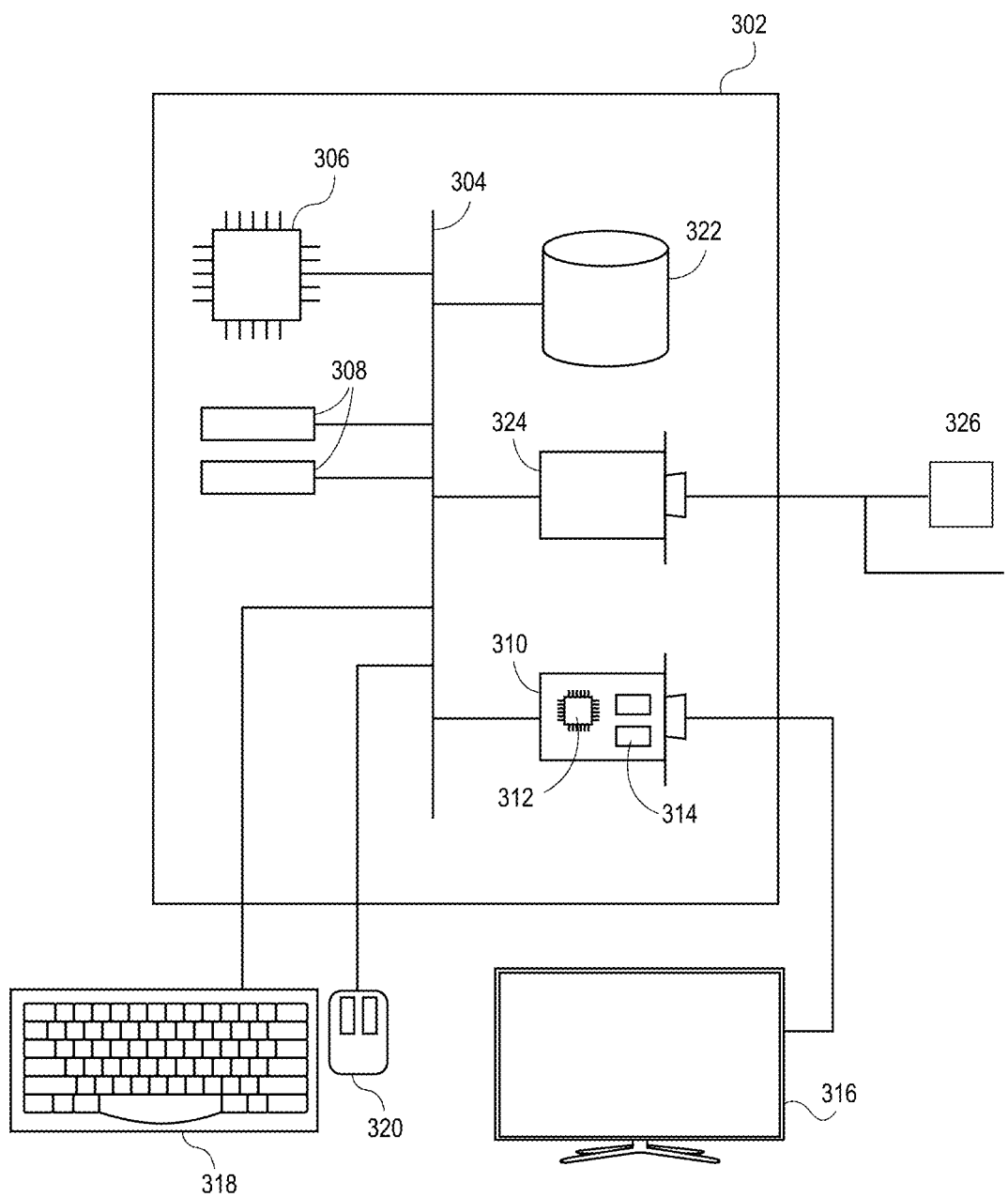
FIG. 3 is a schematic view of exemplary computing components to be used with a laser system of some embodiments.

Turning to FIG. 3, an exemplary hardware platform that can form one element of certain embodiments of the invention is depicted. Computer 302 can be a desktop computer, a laptop computer, a server computer, or any other form factor of general- or special-purpose computing device. Depicted with computer 302 are several components, for illustrative purposes. In some embodiments, certain components may be arranged differently or absent. Additional components may also be present. Included in computer 302 is system bus 304, whereby other components of computer 302 can communicate with each other. In certain embodiments, there may be multiple busses or components that may communicate with each other directly. Connected to system bus 304 is central processing unit (CPU) 306. Also attached to system bus 304 are one or more random-access memory (RAM) modules 308. Also attached to system bus 304 is graphics card 310. In some embodiments, graphics card 310 may not be a physically separate card, but rather may be integrated into the motherboard or the CPU 306. In some embodiments, graphics card 310 has a separate graphics-processing unit (GPU) 312, which can be used for graphics processing or for spectral analysis. Also on graphics card 310 is GPU memory 314. Connected (directly or indirectly) to graphics card 310 is display 316 for user interaction. In some embodiments no display is present, while in others it is integrated into computer 302. Similarly, peripherals such as keyboard 318 and mouse 320 are connected to system bus 304. Like display 316, the peripherals may be integrated into computer 302 or absent. Also connected to system bus 304 is local storage 322, which may be any form of computer-readable media, and may be internally installed in computer 302 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 324 is also attached to system bus 304 and allows computer 302 to communicate over a network. NIC 324 can be any form of network interface known in the art, such as Ethernet, ATM, fiber, Bluetooth, or Wi-Fi (i.e., the IEEE 802.11 family of standards). NIC 324 may connect computer 302 to a local network, which may also include one or more other computers, hardware components, storage devices, servos, laser components, and/or detectors. In some embodiments, NIC 324 may connect computer 302 to a detector 326 such as camera 236. In some embodiments, NIC 324 may connect computer 302 to a stage, such as stage 118 of laser system 100 or stage 234 of laser system 200. In some embodiments, NIC 324 may connect computer 302 to a light source, such as light source 102 of laser system 100 or light source 202 of laser system 200. In some embodiments, NIC 324 may connect computer 302 to optical components of a laser system, such as shutter 104, half-wave plates 106, 210, lenses 116, 232, autocorrelator 228, trailing pulse stage 214, leading pulse stage 220, or others. The local network may in turn be connected to Internet, or in some embodiments computer 302 may itself be directly connected to Internet.

FIGS. 4A-4F illustrate the resultant laser engravings made on a substrate using laser system 100/200, in some embodiments, and are best viewed together in the following description. Depicted are standard electron microscope (SEM) images in FIGS. 4A, 4C, and 4E and a three-dimensional heat map depictions of that substrate in FIGS. 4B, 4D, and 4F. Engravings on each substrate include peaks 502, 504, and 506, and troughs 508, 510, and 512. Each trough, corresponding with the peaks juxtaposed to the trough, form a parallel channel 514. Corresponding peaks 502, 504, 506 and troughs 508, 510, 512 are labeled on the SEM images (FIGS. 4A, 4C, and 4E) and heat-map images (FIGS. 4B, 4D, and 4F). Peaks 502, 504, 506 and troughs 508, 510, 512 are formed via engraving techniques using laser system 100/200. In some embodiments, factors determining the overall size of parallel channels 514 include pulse count, fluence (i.e., power of laser), scan velocity, pitch, beam diameter, and material composition of the sample or substrate. This list is not to be construed as limiting the scope of the invention, as other factors known to one skilled in the art may influence the size of parallel channels 514. In some embodiments, the fluence may be between about 0.8 J/cm$^2$ to about 19 J/cm$^2$. In some embodiments, the fluence may be between about 7 J/cm$^2$ to about 19 J/cm$^2$. In some embodiments, the fluence may be between about 1.09 J/cm$^2$ to about 1.95 J/cm$^2$. In some embodiments, the fluence may be between about 0.91 J/cm$^2$ to about 2.66 J/cm$^2$. In some embodiments, and the pulse count may be between about 100 to about 2000. In some embodiments, the pulse count may be between about 100 to about 1000. In some embodiments, pulse count may be between about 20 to about 100. These values may vary depending on the substrate. The greater the fluence, the greater the size of the microstructures and the greater the size of the pits created on the surface. In some embodiments, the pulse length may be about 50 fs to about 100 fs, or about 80 fs.

FIGS. 4A-4F illustrate differing sizes of parallel channels 514, which were formed by altering different aforementioned aspects of laser system 100/200. For example, FIGS. 4A-B depict a smaller distance between parallel channels 514 compared to FIGS. 4C-D, which similarly depict a smaller distance between parallel channels 514 compared to FIGS. 4E-F. Additionally, trough 508 is less shallow than trough 510, which is similarly less shallow than trough 512. As mentioned previously, sizing of peaks 502, 504, 506 and troughs 508, 510, 512 is regulated by factors associated with laser system 100/200 and material composition of sample (e.g., sample 240). For example, as seen in FIG. 4G, a line scan path 516 of source beam (e.g., source beam 238) may be used to ablate regions, therein forming troughs 508, 510, 512. The distance between line scans, in this example distance alpha, may determine the sizing of parallel channels 514. For example, the pitch (i.e., distance alpha) may be about 40 μm. This would generate parallel channels 514 comprising a shorter width than another example in which the pitch (i.e., distance alpha) is about 80 μm. These distances are intended for exemplary purposes only, as the pitch may be any reasonable distance to form parallel channels 514 of desired sizes for downstream purposes, such as a microfluidic device.

Furthermore, other aspects of parallel channels 514 may be altered by adjusting other features of laser system 100/200. In some embodiments, the fluence (i.e., laser power) may be adjusted to alter the deepness of a trough. For example, the fluence may be increased, which, may form a deeper trough. In some embodiments, the scan velocity may be adjusted to alter the deepness of a trough. For example, the scan velocity may be decreased, therein increasing the time in which an individual location on the substrate will be subjected to laser ablation, thereby forming a deeper trough. In some embodiments, the beam diameter may be adjusted to alter the size of the trough. For example, the distance between focusing lens (e.g., lens 232) and the sample (e.g., sample 240) may be decreased, therein decreasing the beam diameter when interacting with the sample. In this example, the width of the trough formed would decrease due to the decreased beam diameter. In some embodiments, the pulse count may be adjusted to alter the size of the trough. For example, the pulse count may be increased to increase the amount of time a specific location of the sample will be ablated by the source beam, therein increasing the depth of the trough. In some embodiments, the material composition of the sample may be adjusted to alter the size of the parallel channels 514. For example, a tougher material (i.e., material having a greater density) may be used to decrease the overall size of parallel channels as it would take longer to ablate the same amount of material. The aforementioned examples are not to be construed as limiting the scope of the invention, as any individual factor or combination of factors may be adjusted in any direction to obtain the desired size of parallel channels 514.

In some embodiments, the sizing and direction of parallel channels 514 may be used to convey desired inherent properties of a microfluidic device such as hydrophobic or hydrophilic paths. For example, the spacing of parallel channels 514 may convey hydrophilic properties, in which the liquid naturally is absorbed into the troughs of the parallel channels 514. Similarly, the direction of the parallel channels 514 may then wick the liquid along that axis. These microstructures may be desirable for a number of applications related to microfluidic devices.

Figure 5B:
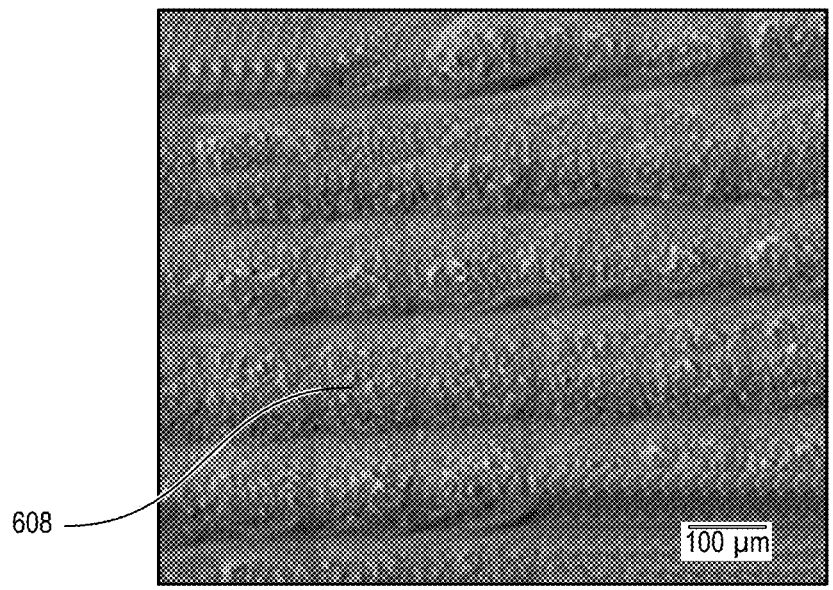
Figure 5C:
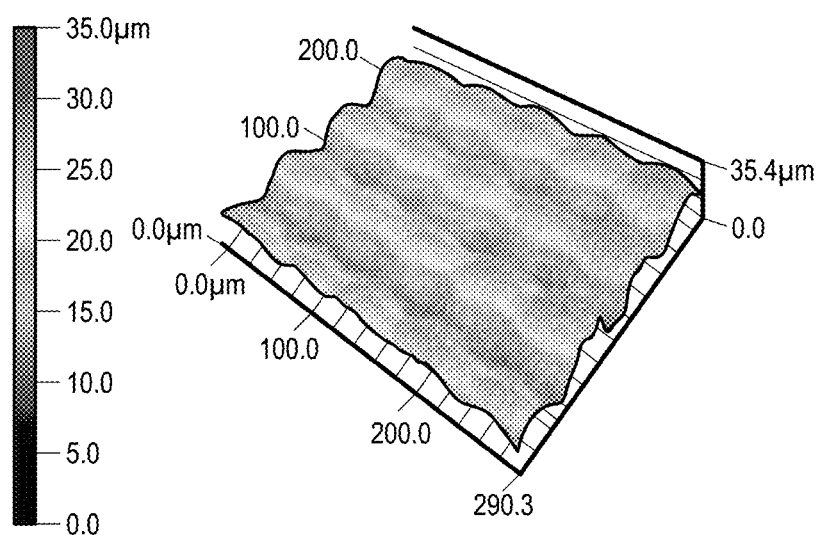

FIGS. 5A-5C illustrate engravings made on a substrate using laser system 100/200, in some embodiments. Depicted is an SEM image in FIG. 5B and the corresponding three-dimensional heat map in FIG. 5C. FIG. 5A is a depiction of an overall line scan 602 comprising a first scan 604 and a second scan 606. As depicted, first scan 604 is conducted along the y-axis while second scan 606 is conducted along the x-axis. The resulting microstructure of the material is shown in the SEM image (FIG. 5B) and three-dimension heat map (FIG. 5C), which comprises pyramidal protrusions 608. The sizing of pyramidal protrusions 608 may be determined from the combination of factors listed above in relation to FIGS. 4A-4G and the first scan 604 and second scan 606.

Pyramidal protrusions 608 illustrate one type of microstructure, in some embodiments, which may improve hydrophilic or hydrophobic properties of the substrate chosen for the microfluidic device. For example, larger pyramidal protrusions 608 (i.e., deeper and/or wider troughs) may provide hydrophilic or superhydrophilic properties by allowing the liquid to wick between the pyramidal protrusions 608 and diffuse quickly through the processed surfaces. Such qualities may be advantageous for some purposes of microfluidic devices, such as passive mixing of liquids. Other purposes of such structures may be used to separate mixtures of differing compositions. For example, a heterogeneous mixture comprising a liquid (i.e., hydrophilic) and an oil (i.e., hydrophobic), may be separated by exposing it to a hydrophilic microstructure, such as described above, which would naturally absorb and wick away the liquid while leaving the oil behind. These embodiments will be further described below.

Figure 5D:
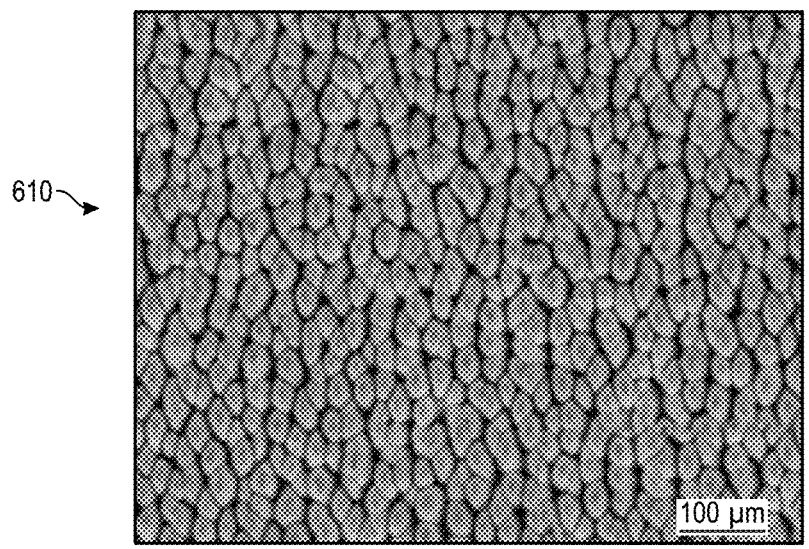
Figure 5E:
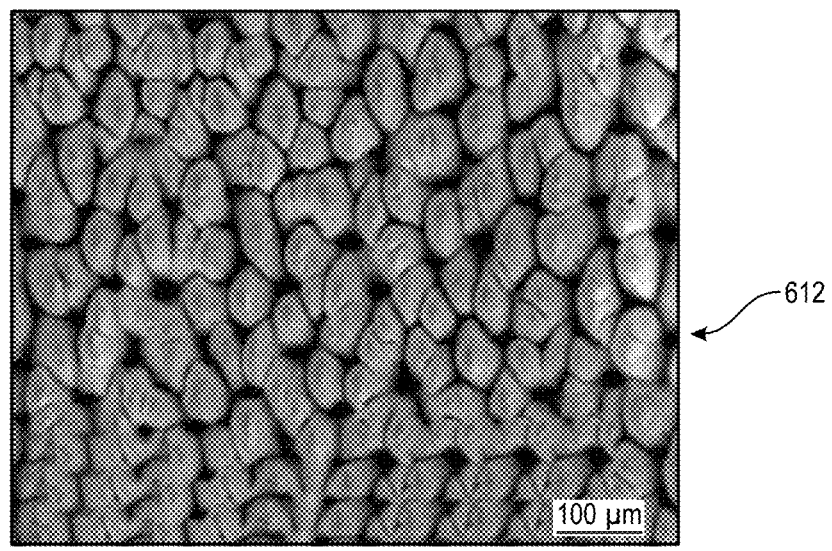

FIGS. 5D-5E further illustrate other microstructures on the surface of a substrate formed via laser system 100/200, in some embodiments. As illustrated, differing microstructures may be constructed by altering parameters of laser system 100/200, as mentioned above. In this example, microstructures depicted in FIG. 5D and FIG. 5E were formed by adjusting the fluence of the source beam. For example, microstructure 610 was generated using a fluence of about 1.09 $J/cm^2$, whereas microstructure 612 was generated using a fluence of about 1.92 $J/cm^2$. Other parameters, such as pulse count, material composition, etc. were kept the same between treatments. As described above, microstructures of these materials may provide desired traits for later use in microfluidic devices, such as hydrophobicity or hydrophilicity.

Referring now to FIG. 6, an exemplary flow-chart diagram, referred to generally as numeral 700, is depicted relating to some embodiments. At step 702, a substrate is engraved via a femtosecond laser. In some embodiments, engraving may be performed by one or more of laser system 100 or laser system 200. In some embodiments, engraving may include processing a surface of a substrate which has not been processed before. For example, a glass substrate comprising a surface virtually unprocessed may be engraved. In some embodiments, engraving may include processing a surface of a substrate which has been processed before. For example, a quartz substrate comprising a surface including channels preprocessed into the surface of the substrate.

In some embodiments, engraving of the substrate may comprise using a laser system, such as laser system 100/200, to engrave channels within the substrate. Examples of this may include engraving techniques depicted in FIGS. 4A-4F, wherein parallel channels may be engraved in a desired direction to aid in the movement of liquid. In some embodiments, parallel channels may be between about 1 μm to about 50 μm wide. In some embodiments, parallel channels may be between about 50 μm to about 100 μm wide. In some embodiments, parallel channels may be between about 100 μm to about 500 μm wide. In some embodiments, parallel channels may be between about 500 μm to about 2 mm wide. In some embodiments, larger portions of the substrate may be engraved using the laser to form paths within the surface of the substrate. An example of this is depicted in FIG. 7, and described in greater detail below. In some embodiments, paths may be between about 100 μm to about 500 μm wide. In some embodiments, paths may be between about 500 μm to about 1 mm wide. In some embodiments, paths may be between about 1 mm to about 3 mm wide. In some embodiments, paths may be between about 3 mm to about 10 mm wide. It is further contemplated that paths or parallel channels may be engraved in the surface of a substrate in any number of shapes or sizes as to provide a desirable effect in a microfluidic device.

In some embodiments, engraving of the substrate may comprise engraving one or more input paths as well as one or more output paths. The input paths and/or output paths may be configured, in embodiments, to fluidly connect to other external components for the process of flow chemistry. For example, external components may include tubing, plates, microfluidic devices, containers, tanks, bottles, etc. In some embodiments, the input paths and/or output paths may be configured to connect to a pressurized source, such as pressurized air. In some embodiments, the input paths and/or output paths may be configured to connect to a vacuum. In some embodiments, pressurized air or vacuum may be used to aid in the flow of liquid through the microfluidic device.

The substrate used in step 702 may comprise a material suitable to downstream microfluidic purposes. In some embodiments, the substrate may comprise a transparent or semi-transparent material for visualization of the liquid passage therethrough. In some embodiments, the substrate may comprise a glass composition, such as borosilicate glass. In some embodiments, the substrate may comprise a quartz composition. In some embodiments, the substrate may be partially opaque. In some embodiments, the substate may comprise a metallic composition or a metal alloy. In some embodiments, the substrate may comprise one or more of a nickel alloy, a chromium alloy, an iron alloy, or a molybdenum alloy. In some embodiments, the substrate may comprise a nickel-chromium-iron-molybdenum alloy, such as Hastelloy® X.

In some embodiments, engraving may occur on a surface of the substrate. In some embodiments, the femtosecond laser system may be used to engrave an internal portion of the substrate. Such an engraving technique may be performed by focusing the point of the laser beam to the internal structure of the substrate. Thus, the focused point may engrave the substrate as it is the most energy, whereas the surface where the laser beam passes through does not encounter enough energy to be significantly altered by the laser beam. Similar techniques, such as water-assisted femtosecond laser drilling, have been previously disclosed as allowing for three-dimensional internal modification techniques. In some embodiments, the laser engraving may modify the contact angle of the substrate to be about 140 degrees to about 170 degrees. In embodiments where the substrate is glass, the laser engraving may modify the contact angle of the substrate to be about 150 degrees. In embodiments where the substrate is a metal alloy, the laser engraving may modify the contact angle of the substrate to be about 162 degrees.

At a step 704, a hydrophobic compound is deposited on the engraved substrate. In some embodiments, the hydrophobic compound is deposited on the entire engraved surface of the substrate. In some embodiments, the hydrophobic compound is deposited on a portion of the engraved surface of the substrate. In some embodiments, the hydrophobic compound is deposited on the areas of the surface not engraved in step 702. In some embodiments, the hydrophobic compound is deposited only on the engraved portions of the engraved surface. In some embodiments, step 704 and/or step 706 may not be included.

The deposition of the hydrophobic compound may comprise any process suitable to deposit the hydrophobic compound on a surface. In some embodiments, the hydrophobic compound may be deposited using gas-phase vapor deposition. In some embodiments, the hydrophobic compound may be deposited using drop-coating methods. In some embodiments, the hydrophobic compound may be deposited via lithographic processes. In some embodiments, the hydrophobic compound may be deposited via sol-gel processes. In some embodiments, other methods of forming hydrophobic surfaces may be used, such as plasma etching or laser texturing. In some embodiments, hydrophobic surfaces may be formed using femtosecond laser engraving techniques, such as those described above.

In some embodiments, the hydrophobic compound may comprise a polymer, which when polymerized, exhibits hydrophobic qualities. In some embodiments, the hydrophobic compound may comprise one or more of a hydrocarbon polymer, a fluorocarbon polymer, or a silicone polymer. In some embodiments, the hydrophobic compound may comprise silane or fluorinated silane. In some embodiments, the hydrophobic compound may comprise 1H,1H,2H,2H-Perfluorooctyltriethoxysilane. In some embodiments, silane is deposited on the engraved surface via gas-phase vapor deposition.

At a step 706, a portion of the hydrophobic compound is removed via a femtosecond laser. For example, a femtosecond laser system, such as laser system 100/200, may be used to selectively remove a portion of the hydrophobic compound deposited onto the engraved surface. In some embodiments, different parameters may be used for the removal step than for the original engraving step. For example, the power of the laser used for the removal may be a quarter of the power that was used for the first engraving step. In some embodiments, the portion of removed hydrophobic compound may partially overlap with the portion of the surface that was engraved in step 702. As such, this portion may be hydrophilic based on engraving techniques used in step 702. In some embodiments, the portion of removed hydrophobic compound may substantially overlap with the portion of the surface that was engraved in step 702.

In some embodiments, the hydrophobic compound may be completely removed from engraved portions comprising a hydrophilic surface. As such, the microfluidic device may comprise a mostly hydrophobic surface juxtaposed to a mostly hydrophilic surface. These embodiments may, for example, provide a microfluidic device in which mixing of one or more liquid compositions may occur by receiving the one or more liquid compositions on the hydrophilic surface, wherein the hydrophobic surface may prevent the one or more liquids from exiting the hydrophilic surface region.

In some embodiments, the hydrophobic compound may be removed from one or more output channels but maintained in one or more other output channels, therein forming at least one output channel comprising a hydrophobic surface and at least one output channel comprising a hydrophilic surface. These embodiments may, for example, provide a microfluidic device in which separation of one or more heterogeneous compositions may occur based on their hydrophobicity or hydrophilicity. In one example, such a microfluidic device may allow for separation of an oil from water.

In some embodiments, the hydrophobic compound may be removed from one portion of a path and remain in a second portion of the same path, thereby forming one path comprising a hydrophobic portion and a hydrophilic portion. These embodiments may, for example, provide a microfluidic device in which separation of one or more heterogeneous compositions may occur side by side within the same path based on their hydrophobicity or hydrophilicity. In some embodiments, this one path may lead into two separate paths, one of which comprises a hydrophobic surface and the other comprises a hydrophilic surface. Accordingly, initial separation of the hydrophobic and hydrophilic compositions in the first path may aid in the latter separation into the diverging paths.

At optional step 708, a cover may be secured to the substrate. Optional step 708 may be advantageous when the paths of the microfluidic device are engraved on an exposed portion of the substrate, such as the surface. For example, if a path is engraved onto the upper surface of the substrate, and this substrate were later used as a microfluidic device, then liquids flowing through the path would be exposed to open air. To prevent this, a cover may be secured to the substrate to effectively seal off the path from the open air. In some embodiments, securing may occur via chemical adhesion, heat ablation, mechanical fastening, or any other commonly used technique known to one skilled in the art.

The cover may comprise any material which would be advantageous for the purposes of a microfluidic device. In some embodiments, the cover may comprise a mostly transparent composition which may allow for visualization of the microfluidics device when functioning. In some embodiments, the cover may comprise a glass. In some embodiments, the cover may comprise quartz. In some embodiments, the cover may comprise a mostly opaque or fully opaque material for preventing light exposures to fluids passing though the microfluidic device. In some embodiments, the cover may comprise a metallic alloy composition. In some embodiments, the cover may comprise a metal. In some embodiments, the cover may comprise a plastic. In some embodiments, the cover may comprise a polymer.

Referring now to FIG. 7, a top view of an exemplary microfluidic device 800 generated by the processes described above is illustrated. The microfluidic device 800, in some embodiments, includes a first path 802, a second path 804, and a third path 806. The microfluidic device 800 may optionally include a pooling area 808. In some embodiments, one or more of the first path 802, the second path 804, the third path 806, and the pooling area 808 may be formed by methods described in FIG. 6 using a femtosecond laser, such as laser system 100/200. In some embodiments, the first path 802 may define an input path (i.e., inflow channel) for microfluidic device 800, wherein a heterogeneous mixture may be received. In some embodiments, the second path 804 and third path 806 may define output paths (i.e., outflow channels) for microfluidic device 800. In some embodiments, second path 804 may comprise a hydrophobic surface, formed by methods depicted in FIG. 6. In some embodiments, third path 806 may comprise a hydrophilic surface, formed by methods depicted in FIG. 6. Accordingly, in the aforementioned embodiments, the microfluidic device 800 may be used to separate the heterogeneous mixture by means of hydrophobicity via second path 804 and hydrophilicity via third path 806.

In some embodiments, second path 804 and third path 806 may define input paths (i.e., inflow channels) for microfluidic device 800, wherein separate liquid compositions may be received. In some embodiments, first path 802 may define an output path (i.e., outflow channel) for microfluidic device 800. In some embodiments, one or more of second path 804, third path 806, and first path 802 may comprise a hydrophilic surface, formed by methods depicted in relation to FIG. 6. In some embodiments, surface 810 may comprise a hydrophobic surface, formed by methods depicted in relation to FIG. 6. Accordingly, in the aforementioned embodiments, the microfluidic device 800 may be used to mix separate liquids via the hydrophilic paths 802, 804, 806.

It will be noted that while the exemplary microfluidic device 800 is shown with three paths 802, 804, and 806, there may be any number of paths in the microfluidic device 800 based on the desired use.

It is further contemplated that one or more paths may comprise differing depths engraved. Referring to FIG. 8A-8B, two exemplary side views of a path are illustrated.

In FIG. 8A-B, arrows depict the flow of a liquid through the path. In some embodiments, differing depths may be engraved into the path using method 700. These differing depths may aid in the flow or mixture of one or more liquids in a microfluidic device. For example, in FIG. 8A, the differing depths depicted in profile 902 illustrate how the flow may be aided by decreasing the height of the path, therein increasing the flow rate of a liquid through the path via gravity and furthermore restricting backflow. In another example, in FIG. 8B, the differing depths depicted in profile 904 illustrate how the mixing of liquids may be enhanced by certain profiles. In this example, the initial increase in depth followed by a sharp protrusion may cause a vortex of the liquid as it flows through the path. In this example, if mixing one or more liquids in the microfluidic device, the mixing may be enhanced by profile 904, therein forming a homogeneous mixture efficiently and passively based upon the profile of the path. It will be noted that while two profiles 902, 904 are depicted, any number of possible profiles may be generated in a path to aid in flow, separation, or mixing of liquids through the microfluidic device.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A microfluidic device comprising:
   a substrate comprising an upper surface;
   one or more inflow channels laser-engraved into the upper surface;
   one or more outflow channels laser-engraved into the upper surface, said one or more outflow channels fluidly connected to the one or more inflow channels;
   a first laser-engraved portion of the upper surface configured to be hydrophilic;
   a second portion of the upper surface configured to be hydrophobic,
   wherein at least one of the first laser-engraved portion or the second portion comprises a decrease in height in a flow direction to increase a flow rate of a fluid via gravity.

2. The microfluidic device of claim 1, wherein the one or more inflow channels comprise the first laser-engraved portion.

3. The microfluidic device of claim 1, wherein the one or more outflow channels comprise the first laser-engraved portion.

4. The microfluidic device of claim 1, further comprising a pooling area disposed between the one or more inflow channels and the one or more outflow channels.

5. The microfluidic device of claim 1, wherein the one or more outflow channels comprise the second portion.

6. The microfluidic device of claim 1, wherein the first laser-engraved portion comprises microstructures configured to be hydrophilic formed via a femtosecond laser.

7. The microfluidic device of claim 1, wherein the second portion comprises a hydrophobic compound coated thereon.

8. A system for mixing or separating liquids, the system comprising:
   a microfluidic device comprising a substrate having an upper surface;
   at least one input path and at least one output path on the upper surface;
   a first laser-engraved portion of the upper surface comprising a microstructure pattern configured to make the first laser-engraved portion hydrophilic;
   a second portion of the upper surface comprising a hydrophobic compound disposed thereon,
      wherein the second portion is configured to be hydrophobic,
   wherein at least one of the first laser-engraved portion or the second portion comprises:
      a decrease in a height at a first point and a protrusion downstream of the first point having a greater height than the first point to cause a vortex of a fluid as the fluid flows downstream.

9. The system of claim 8, wherein the microstructure pattern comprises a plurality of pyramidal protrusions engraved via a femtosecond laser.

10. The system of claim 8, wherein the at least one input path and the at least one output path comprise openings configured to be fluidly coupled to external components of a flow chemistry process.

11. The system of claim 8, wherein the at least one input path and the at least one output path are laser-engraved into the upper surface of the substrate.

12. The system of claim 8, further comprising a mixing pool fluidly coupled to the at least one input path and the at least one output path and disposed therebetween.

13. The system of claim 8, wherein the at least one input path comprises at least two input paths comprising the first laser-engraved portion, thereby configured to mix hydrophilic compositions.

14. The system of claim 8, wherein the at least one output path comprises a first output path and a second output path, wherein the first output path comprises the first laser-engraved portion and the second output path comprises the second portion, thereby configured to separate hydrophilic compositions along the first output path and hydrophobic compositions along the second output path.

15. The system of claim 8, wherein the substrate comprises glass, quartz, or a metal alloy.

16. A method of manufacturing a microfluidic device having a hydrophilic region and a hydrophobic region, the method comprising:
   providing a substrate comprising an upper surface;
   engraving a first portion of the upper surface via laser pulses using a femtosecond laser to create one or more inflow channels, wherein the first portion is configured to be hydrophilic;
   engraving a second portion of the upper surface via laser pulses using the femtosecond laser to create one or more outflow channels, wherein the one or more outflow channels are fluidly connected to the one or more inflow channels,
   wherein at least one of the first portion or the second portion comprises at least one of:
      a decrease in height in a flow direction to increase a flow rate of a fluid via gravity, or
      a decrease in the height at a first point and a protrusion downstream of the first point having a greater height than the first point to cause a vortex of the fluid as the fluid flows downstream; and
   coating a hydrophobic compound on the second portion of the substrate such that the second portion is hydrophobic.

17. The method of claim 16, wherein the femtosecond laser comprises a single-pulse femtosecond laser or a dual-pulse femtosecond laser.

18. The method of claim 16, further comprising:
removing a section of the hydrophobic compound from the substrate via the femtosecond laser.

19. The microfluidic device of claim 1, wherein the second portion is laser-engraved to be hydrophobic.

20. The microfluidic device of claim 8, further comprising a cover coupled to the upper surface of the substrate.

* * * * *